(12) United States Patent
Vincent et al.

(10) Patent No.: US 10,048,979 B2
(45) Date of Patent: *Aug. 14, 2018

(54) MANAGING VIRTUAL MACHINE MIGRATION

(71) Applicant: Amazon Technologies, Inc., Seattle, WA (US)

(72) Inventors: Pradeep Vincent, Kenmore, WA (US); Nathan Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/012,688

(22) Filed: Feb. 1, 2016

(65) Prior Publication Data

US 2016/0378532 A1 Dec. 29, 2016

Related U.S. Application Data

(63) Continuation of application No. 12/980,270, filed on Dec. 28, 2010, now Pat. No. 9,250,863.

(51) Int. Cl.
| | |
|---|---|
| *G06F 9/48* | (2006.01) |
| *G06F 9/455* | (2018.01) |
| *G06F 8/10* | (2018.01) |
| *G06F 9/50* | (2006.01) |

(52) U.S. Cl.
CPC ............ *G06F 9/45558* (2013.01); *G06F 8/10* (2013.01); *G06F 9/4856* (2013.01); *G06F 9/5088* (2013.01); *G06F 2009/4557* (2013.01); *G06F 2009/45595* (2013.01); *G06F 2209/5019* (2013.01)

(58) Field of Classification Search
CPC ......... G06F 9/45558; G06F 2009/4557; G06F 9/485; G06F 2009/45583; H04L 12/4641
See application file for complete search history.

(56) References Cited

U.S. PATENT DOCUMENTS

| | | | |
|---|---|---|---|
| 8,095,929 B1 | 1/2012 | Ji et al. | |
| 8,102,781 B2 | 1/2012 | Smith | |
| 8,615,579 B1 | 12/2013 | Pradeep et al. | |
| 8,799,920 B2 | 8/2014 | Lubsey et al. | |
| 8,880,773 B2 | 11/2014 | Costa | |
| 9,098,214 B1 | 8/2015 | Pradeep et al. | |
| 9,250,863 B1 | 2/2016 | Pradeep et al. | |
| 9,703,598 B2 | 7/2017 | Vincent et al. | |
| 9,720,727 B1 | 8/2017 | Vincent et al. | |
| 2002/0038301 A1* | 3/2002 | Aridor | G06F 9/465 |
| 2004/0168030 A1* | 8/2004 | Traversat | G06F 9/45504 711/133 |
| 2005/0160423 A1* | 7/2005 | Bantz | G06F 9/4881 718/1 |
| 2006/0143350 A1* | 6/2006 | Miloushev | G06F 9/5016 710/242 |

(Continued)

*Primary Examiner* — Ninos Donabed
(74) *Attorney, Agent, or Firm* — Knobbe, Martens, Olson & Bear, LLP

(57) ABSTRACT

Systems and method for the management of migrations of virtual machine instances are provided. A migration manager monitors the resource usage of a virtual machine instance over time in order to create a migration profile. When migration of a virtual machine instance is desired, the migration manager schedules the migration to occur such that the migration conforms to the migration profile.

21 Claims, 8 Drawing Sheets

(56) References Cited

U.S. PATENT DOCUMENTS

| | | | |
|---|---|---|---|
| 2007/0079307 A1 | 4/2007 | Dhawan et al. | |
| 2007/0234077 A1* | 10/2007 | Rothman | G06F 1/3203 713/300 |
| 2008/0059556 A1* | 3/2008 | Greenspan | G06F 9/5077 709/201 |
| 2008/0155537 A1 | 6/2008 | Dinda et al. | |
| 2008/0163239 A1 | 7/2008 | Sugumar et al. | |
| 2008/0222375 A1 | 9/2008 | Kotsovinos et al. | |
| 2008/0222638 A1 | 9/2008 | Beaty et al. | |
| 2008/0295096 A1* | 11/2008 | Beaty | G06F 9/4856 718/1 |
| 2009/0007106 A1* | 1/2009 | Araujo, Jr. | G06F 9/54 718/1 |
| 2009/0089860 A1* | 4/2009 | Forrester | H04L 63/12 726/3 |
| 2009/0094603 A1* | 4/2009 | Hiltgen | G06F 9/4406 718/1 |
| 2009/0132840 A1* | 5/2009 | Talwar | G06F 1/3203 713/320 |
| 2009/0187775 A1 | 7/2009 | Ishikawa | |
| 2009/0198817 A1 | 8/2009 | Sundaram et al. | |
| 2010/0191854 A1 | 7/2010 | Isci et al. | |
| 2010/0242045 A1 | 9/2010 | Swamy et al. | |
| 2010/0250868 A1* | 9/2010 | Oshins | G06F 12/0284 711/154 |
| 2010/0251234 A1* | 9/2010 | Oshins | G06F 9/4856 718/1 |
| 2011/0004735 A1* | 1/2011 | Arroyo | G06F 9/455 711/162 |
| 2011/0161491 A1 | 6/2011 | Sekiguchi | |
| 2011/0219372 A1 | 9/2011 | Agrawal et al. | |
| 2011/0289333 A1 | 11/2011 | Hoyer et al. | |
| 2012/0011254 A1 | 1/2012 | Jamjoom et al. | |
| 2012/0023223 A1* | 1/2012 | Branch | G06F 9/4856 709/224 |
| 2012/0166644 A1 | 6/2012 | Liu et al. | |
| 2015/0339156 A1 | 11/2015 | Pradeep et al. | |

* cited by examiner

MANAGING VIRTUAL MACHINE MIGRATION

CROSS-REFERENCE TO RELATED APPLICATIONS

This application is a continuation of U.S. patent application Ser. No. 12/980,270, entitled MANAGING VIRTUAL MACHINE MIGRATION, and filed Dec. 28, 2010, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machine instances that appear and operate as independent computing devices to users of a data center. With virtualization, the single physical computing device can create, maintain, delete, or otherwise manage virtual machine instances in a dynamic matter. In turn, users can request computer resources from a data center, including single computing devices or a configuration of networked computing devices, and be provided with varying numbers of virtual machine resources.

In some instances, migration of a virtual machine instances may be desirable, such that the virtual machine is relocated from a first physical computing device to a second computing device. In many instances, the length of time which a migration requires is related to the amount of resources that the virtual machine instance is utilizing at the time of migration. Additionally, migration of a virtual machine may result in some amount of downtime of the virtual machine instance, denying a user to access a virtual machine during that downtime. In many instances, the amount of downtime required for a migration grows larger as the required migration time of a virtual machine instance grows.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
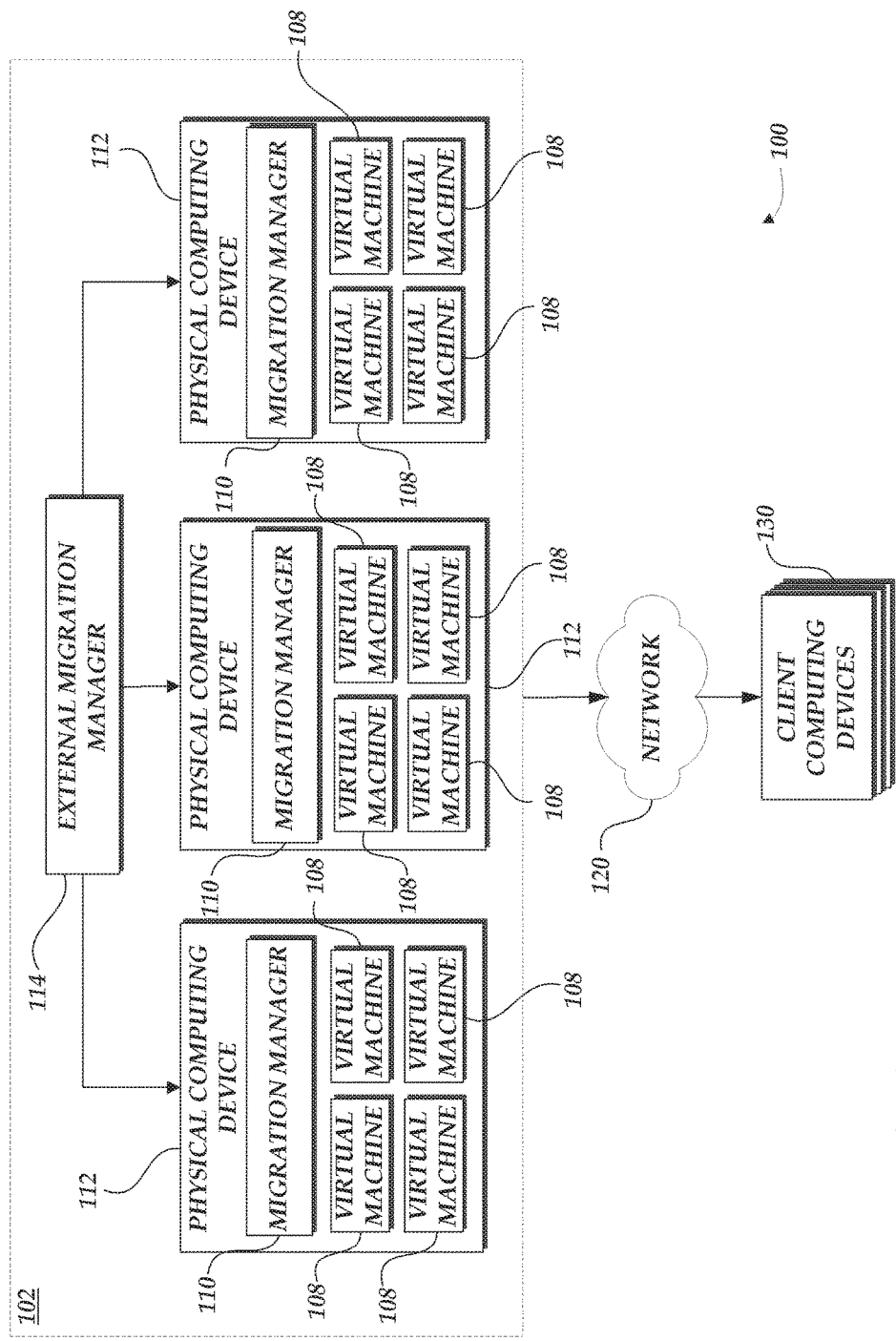
FIG. 1 is a block diagram illustrating an embodiment of a virtual network having physical computing devices including virtual machine instances associated with a migration manager.

Generally described, aspects of the present disclosure relate to the management of virtual machine instances. Specifically, systems and methods are disclosed which facilitate scheduling of migrations of virtual machine instances between physical computing devices. In one aspect, a migration manager component monitors the resource usage of a virtual machine instance which is hosted on a first physical computing device. The migration manager determines patterns in the resource usage of the virtual machine instance over a period of time. For example, the migration manager may monitor a virtual machine instance's use of random access memory (RAM). Based on this example, the virtual machine may, at certain time periods in a 24-hour cycle, utilize varying amounts of RAM.

Using the determined pattern of resource usage, the migration manager may create a migration profile for the virtual machine instance. Such a migration profile allows the scheduling of desired virtual machine instance migrations according to the virtual machine instance's predicted resource usage. For example, in the event a migration of a virtual machine may be required or requested, a migration manager component can utilize the migration profile in order to mitigate the unavailability of the virtual machine instance. Illustratively, the migration monitor component may schedule a migration of the virtual machine instance to occur at a point of relatively low resource usage, as determined by the migration profile. A planned migration of the virtual machine instance during a time frame of relatively low resource usage may result in a quicker migration period, since used resources may require duplication of the resource's state or information during migration. As such, access to the virtual machine instance is increased over a migration. Accordingly, the virtual machine instance may be associated with less time of unavailability.

As a further example, the migration monitor may monitor, as part of a virtual machine instance's resource usage, the availability of network resources to the virtual machine instance. Increased network resource availability may allow larger amounts of information to be transferred between physical computing devices. This increased network resource availability may, for example, allow more rapid migration of virtual machine instances and mitigate unavailability of the virtual machine instance. As such, a migration profiles may include information pertaining to patterns of network availability. In still further embodiments, a migration manager may utilize network resource information during the migration of a virtual machine instance. For example, if, based on a determined pattern of network resource usage, a migration manager determines that network resources may soon become more limited, the migration manager may increase the network resources used by the migration in order to end the migration before the time period of limited network resources.

In still another aspect, migration profiles may be created for groups of virtual machine instances, which may exist on one or more physical devices. In these embodiments, a migration profile may include information corresponding to multiple virtual machine instances, as well as resources shared between the virtual machine instances. Examples of such resources include, but are not limited to, shared network resources or CPU resources.

Specific embodiments and example applications of the present disclosure will now be described with reference to the drawings. These embodiments and example applications are intended to illustrate, and not limit, the present disclosure.

FIG. 1 is a block diagram illustrating an embodiment of a virtual network including migration managers. The illustrated example includes multiple physical computing devices 112, each physical computing device 112 hosting multiple virtual machine instances 108, and a migration manager 110. Illustratively, the migration managers 110 may monitor the virtual machine instances 108 hosted by the respective physical machine 112 in which the migration manager 110 resides. Illustratively, the migration managers 110 are capable of monitoring the resource usage of each virtual machine instance 108. As described above, this resource usage may correspond to a virtual machine instance 108's use of RAM or access requests to RAM. In some embodiments, the resource use may correspond to a virtual machine instance 108's use of other resources, such as hard disk drive (HDD) usage, central processing unit (CPU) usage, graphics processing unit (GPU) usage, or network resources. Additionally, various metrics of resource use may be applied to monitored resources. Examples of such metrics include, but are not limited to, the amount of resources used, the change velocity of resource use, and the latency associated with a resource use. Though these resources are described for illustrative purposes, one of ordinary skill in the art will appreciate that the migration manager 110 may monitor any resources available to the virtual machine instance 108.

As will be described in more detail below, the migration managers 110 may further determine patterns of resource use by one or more of the virtual machine instances 108, and create a migration profile for each virtual machine instance 108. In some embodiments, the migration managers 110 may receive requests to migrate a virtual machine instance 108, and respond to the request by scheduling the migration of the virtual machine instance 108 according to the migration profile of the virtual machine instance 108. In other embodiments, the migration manager may determine that a migration should occur without receiving a request to migrate. Examples of such occurrences include, but are not limited to, determinations that external events, such as power limits, require migration or determinations that one or more virtual machine instances require more or less resources than are being provided in their current physical computing devices 112. In some embodiments, the migration manager can cause the migration of a virtual machine according to the virtual machine's configuration. For example, where a virtual machine is connected to remote storage, such as network attached storage (NAS), the migration manager may additionally determine whether to cause the migration of the information stored within remote storage. Migration of remote storage information may be required, for example, when a migrated virtual machine instance would no longer be able to access the original remote storage, or when the quality of such access would be reduced after a migration of the virtual machine instance. Though the migration managers 110 are shown to be in communication with an external migration manager 114 (which will be described in more detail below), a migration manager 110 may operate independently of an external migration manager 114.

In some embodiments, the physical computing devices 112 may operate via a virtualization operating system. Each virtual machine instance 108, as well as the migration manager 110, may operate under the virtualization operating system. In other embodiments, the migration manager 110 may function within the operating environment of each individual virtual machine instance 108, such as by running within the operating system of the virtual machine instance 108.

In communication with the physical computing devices is an external migration manager 114. Illustratively, the external migration manager 114 may monitor the resource usage of one or more virtual machine instances 108. Additionally, the external migration manager 114 may monitor shared resources of multiple virtual machine instances 108. These shared resources may correspond to any resource utilized by more than one machine. Examples of such shared resources include, but are not limited to, shared network resources, shared CPU usage, shared power usage, and shared memory usage. For example, the external migration manager 114 may monitor network resource availability between two or more virtual machine instances 108.

In some embodiments, the monitored virtual machine instances 108 may correspond to various groupings of instances or physical computing devices 112. For example, the external migration manager 114 may monitor the shared resource usage of all virtual machine instances 108 on a single physical computing device 112. In other embodiments, the external migration manager 114 may monitor shared resource usage of virtual machine instances 108 which correspond to a rack of physical computing devices 118, all computing devices sharing a power distribution unit (PDU), or all computing devices within a data center. Further, the monitoring of shared resources may be determined at least in part based on the groupings of virtual machine instances 108. For example, where all virtual machine instances 108 sharing a PDU are monitored, the external migration manager 108 may be configured to monitor the power usage of the virtual machine instances 108. As will be appreciated by one of ordinary skill in the art, any grouping of virtual machine instances 108 may be monitored by the external migration manager 114.

In some embodiments, the external migration manager 114 may communicate with the migration managers 110. For example, the external migration manager 114 may receive information corresponding to one or more virtual machine instances 108 associated with the migration managers 110. The external migration manager 114 may then create a migration profile for one or more virtual machine instances 108. In still more embodiments, the migration managers 110 may receive information corresponding to other physical machines 112 or their hosted virtual machine instances 108, and use the received information to create or modify migration profiles. Though, the external migration manager 114 is described in some embodiments to communicate with the migration managers 110, the external migration manager 114 may operate independently, without the need for a migration manager 110. Additionally, though, for illustrative purposes, the external migration manager 114 is shown outside of the physical computing devices 112, the external migration manager 114 may itself be hosted by a physical computing device.

Connected to the virtual network 102 via a network 120 are multiple client computing devices 130. The network 120 may be, for instance, a wide area network (WAN), a local area network (LAN), or a global communications network. In some instances, the client computing devices 130 may interact with the migration managers 110 or the external migration manager 114, such as to request the migration of one or more virtual machine instances 108. In other embodiments, the migration managers 110 and the external migration manager 114 may be transparent to the client computing devices 130.

Figure 2:
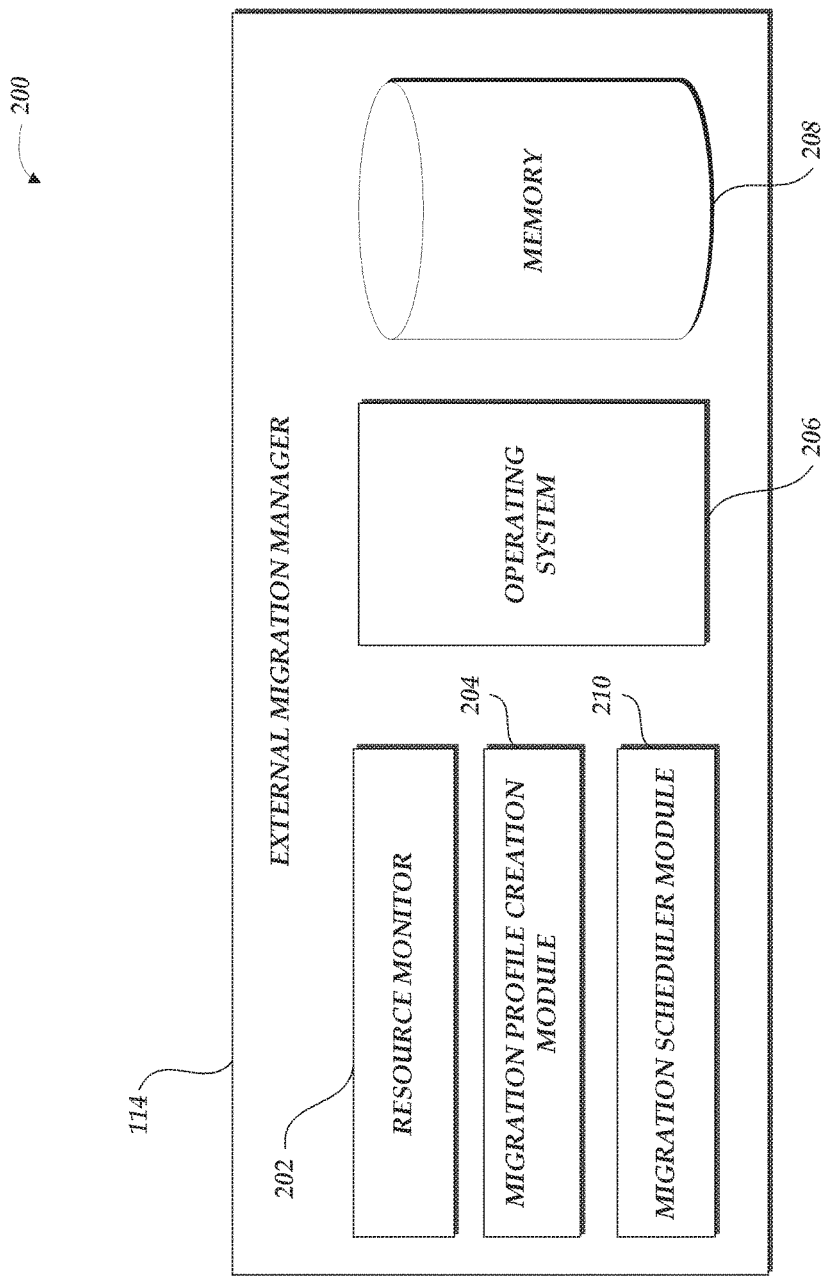
FIG. 2 is a block diagram illustrative of a migration manager component having a resource monitor, a migration profile creator, and a migration scheduler for utilization in the virtual network of FIG. 1.

With respect to FIG. 2, various components of the external migration manager 114 of FIG. 1 are depicted. In this embodiment, the external migration manager 114 has a resource monitor module 202, a migration profile creation module 204, a migration scheduler 210, as well as an operating system 206 and a memory 208. The resource monitor module 202 functions to monitor the resource usage of virtual machine instances, as well as resources available to any number of connected physical computing devices, such as physical computing devices 112 of FIG. 1. As previously described, these resources could illustratively include memory usage of virtual machine instances, processor usage, network resources and availability, or any other resources of the virtual machine instances or physical computing devices.

The migration profile creation module 204 may create migration profiles for any number of virtual machine instances or physical computing devices, or a combination thereof. Illustratively, the migration profile creation module 204 may utilize information from the resource monitor 202 in order to determine patterns of resource use by the components which the migration profile is directed to. As previously stated, the migration profile creation module may determine patterns within various time frames. For example, a virtual machine instance 108 may display patterns of resource use over a period of hours, days, or weeks. In some instances, a virtual machine instance 108 may display multiple patterns simultaneously, such as on both an hourly and a weekly basis. In addition, the migration profile creation module may determine patterns of resource use from combinations of components. In these embodiments, the migration profile creation module 204 may incorporate, in addition to each individual components level of resource use, use of resources that are shared between multiple components. Illustratively, a shared resource may be a network resource available to multiple physical computing devices, such as devices which are attached to common networking devices. As a further example, a shared resource may be a CPU utilized by multiple virtual machine instances, such as where multiple virtual machine instances are hosted by a common physical computing device.

In addition to incorporating information gathered by the resource monitor 202, the migration profile creation module 210 may utilize information gathered by other migration managers, such as migration managers 110 of FIG. 1. For example, the migration profile creation module 204 may utilize migration profiles of individual virtual machine instances 108. In addition, the migration profile creation module 204 may utilize information regarding resource use provided by a migration manager 110. In this embodiment, the migration profile creation module 204 may utilize statistical information to normalize the data or various weighting criteria in processing individual migration profile information.

Information available to the migration profile creation module 204, such as determined patterns of resource use or provided migration profiles, are then utilized by the migration profile creation module 204 to create a migration profile for any number of components, including virtual machine instances, physical computing devices, or a combination thereof. These migration profiles may be stored such that they are retrievable by the external migration manager 114, such as in memory 208.

The migration scheduler module 210 utilizes the stored migration profiles, such as those stored in memory 208, in order to cause the migration of one or more virtual machine instances. As will be described in more detail with reference to FIG. 3, the migration scheduler 210 determines a migration event for one or more virtual machine instances. Illustratively, a migration event may be a request to migrate virtual machine instances from a first physical computing device to a second computing device. The migration scheduler 210 then determines, according to one or more migration profiles of the virtual machine instances, an appropriate time for the migration of each virtual machine instance to occur. The migration scheduler module 210 then causes each desired migration to occur according to the determined schedule.

Illustratively, the resource monitor 202, migration profile creation module 204, and migration scheduler module 210 may be hosted by on a physical computing device having memory 208 and operating with an operating system 206. In some embodiments, the resource monitor 202, migration profile creation module 204, or migration scheduler 210 may function separately, for instance hosted within various operating systems or physical computing devices.

Figure 3A:
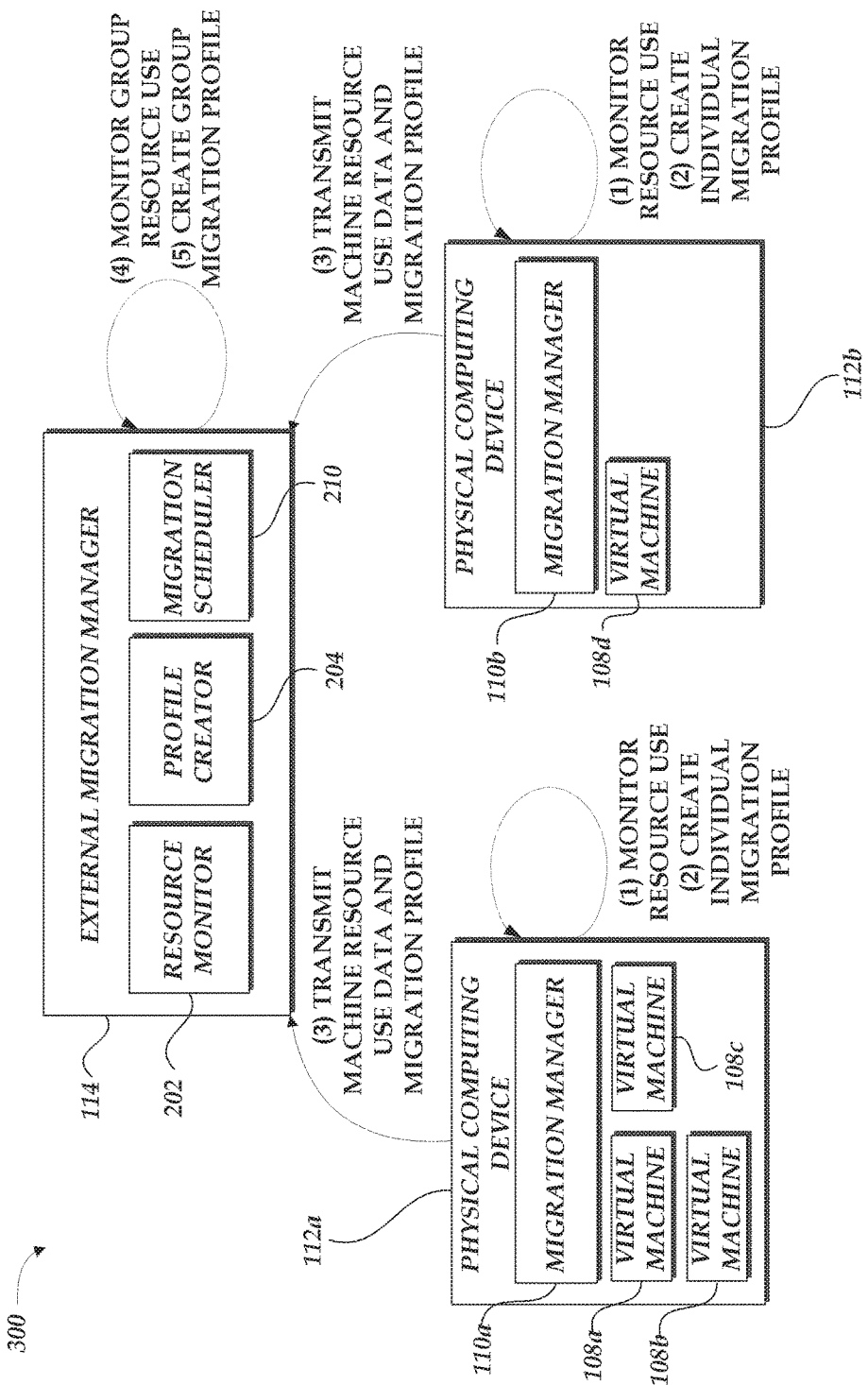
FIGS. 3A-3C are simplified block diagrams of the virtual network of FIG. 1 illustrating the migration of virtual machine instances according to migration profiles.
Figure 3B:
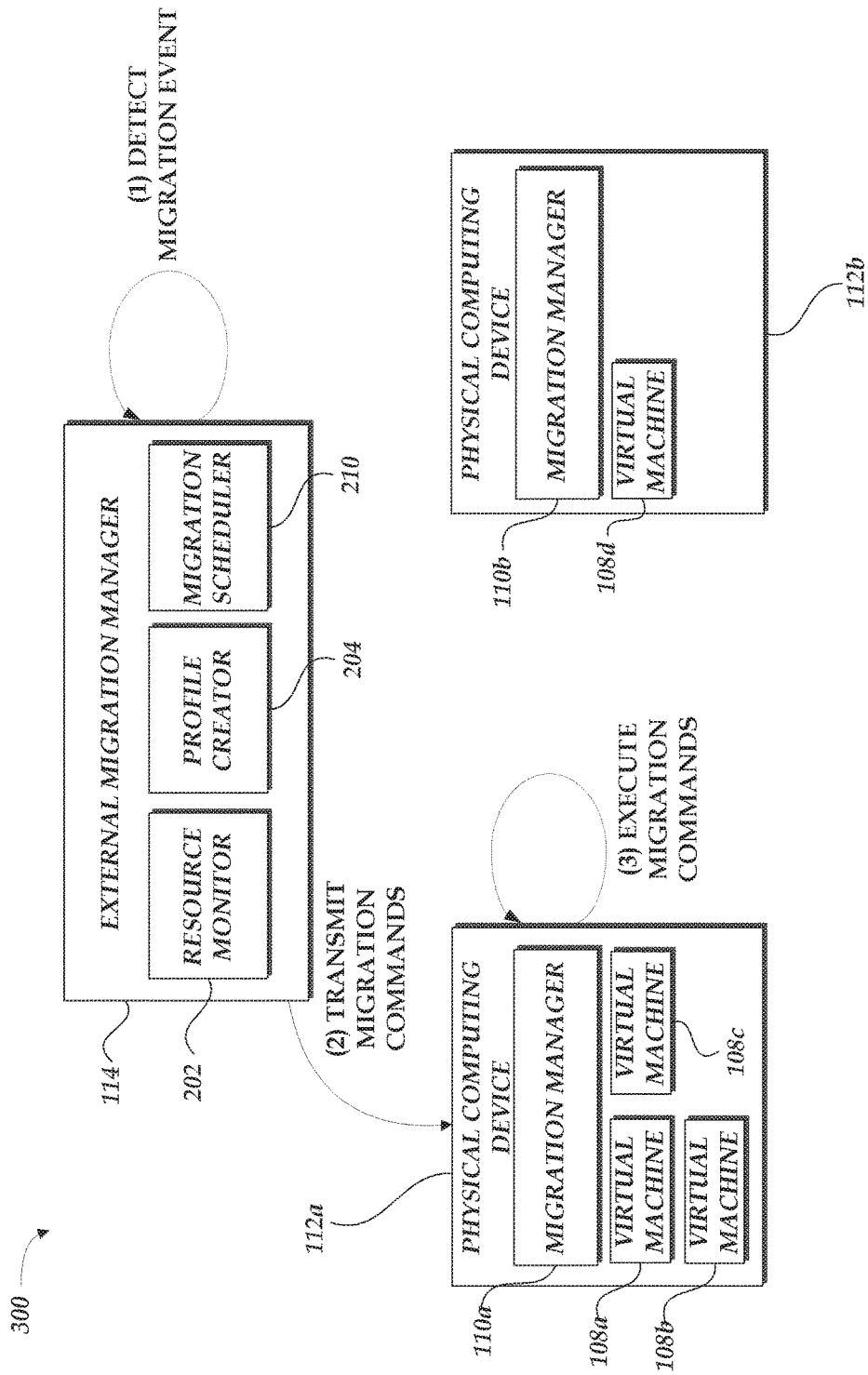
Figure 3C:
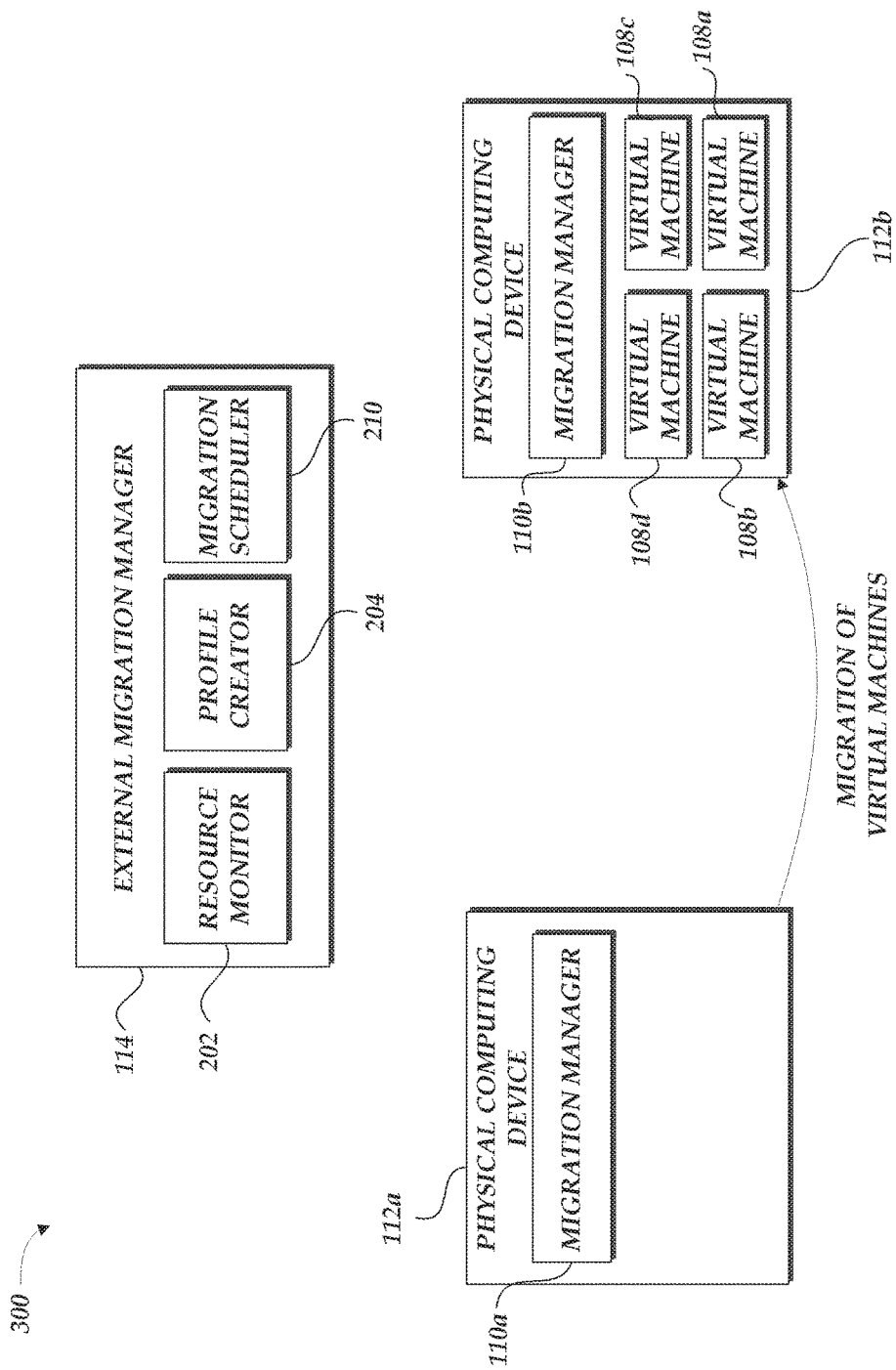

With reference now to FIGS. 3A-3C, simplified block diagrams are shown illustrating the process of migrating one or more virtual machine instances 108 by a migration manager, such as external migration manager 114 of FIG. 1. As illustrated in FIG. 3A, the migration managers 110a and 110b monitor the resource use of virtual machine instances 108. As described above, this resource use may correspond to memory use, CPU usage, or any other resource usage or combination of resource usages. Illustratively, the resource usage, such as memory usage correlating to RAM usage or RAM access, of virtual machine instances 108 is monitored by the migration managers 110. Based on the monitoring, a migration profile is created for each individual virtual machine instance 108 utilizing the gathered resource usage information. For example, migration manager 110a may determine that virtual machine instances 108a, 108b, and 108c have relatively low RAM usage or RAM access during nighttime hours and relatively high RAM usage or RAM access during day time hours. As described above, patterns of resource usage may exist with respect to various time scales, such that RAM usage may vary by the minute, hour, week, or any other time scale. The migration manager 110a would use this determined RAM usage pattern in order to create a migration profile for each machine reflective of the determined RAM usage pattern. In addition, a migration manager, such as migration manager 110a, may utilize other information when creating a migration profile. Illustratively, migration policies may be utilized in conjunction with resource usage information.

Such migration policies may specify, for instance, a maximum downtime of a virtual machine instance during migration. These policies may then be used in conjunction with determined resource use patterns in order to select preferred time periods of migration. For example, virtual machine instance 108a may have a determined pattern of low RAM usage every hour for a period of 5 minutes, as well as every 24 hours for 3 hours. The migration manager 110a may determine that scheduling a migration including the 5 minute period of lowered RAM usage would still require a downtime longer than that allowed within the migration policies. In addition, the migration manager 110a may determine that scheduling a migration including all or part of the 3 hour lowered RAM usage period would result in a downtime within the limitations specified in the migration policies. In this example, migration including all or part of the 3 hour lowered RAM usage period would be preferred to migration during all or part of the 5 minute lowered RAM usage period. In addition to specification of allowed downtime, migration policies may specify that certain time periods are more or less preferred for migration of virtual machine instances, or that migration may not occur within certain time periods. As such, the migration profile may reflect that a certain time period is disfavored for migration of a virtual machine instance, even when it may be a period of lowered resource usage. For example, the 3 hour period of lowered RAM usage described above may occur at a point where access to the virtual machine instance 108a is essential. The migration manager 110a would then determine that, despite the lowered RAM usage of virtual machine instance 108a, a migration should be avoided during this period.

Upon creation of the migration profiles, the monitored resource use data as well as the migration profiles are transmitted from physical machines 112a and 112b to an external migration manager 114. This information may be used in conjunction with resource usage data gathered by the external migration manager 114 in order to create a group migration profile, such as a migration profile covering more than one virtual machine instance 108.

Thereafter, the resource monitor 202 monitors resource usage of one or more virtual machine instances 108. In some embodiments, the resources to be monitored may be determined in part by resource use data and migration profiles that were previously received. For example, where the transmitted resource use data already includes monitoring of RAM usage of virtual machine 108a, the resource monitor 202 may determine that virtual machine 108a should not be further monitored for RAM usage patterns. However, in some instances, even when the transmitted resource use data and migration profiles contain information regarding use of a particular resource, the resource monitor 202 may continue to monitor that particular resource. For example, the resource monitor 202 may monitor resource use already specified in the transmitted information for the purposes of detecting errors. In addition, resource monitor 202 may monitor additional resource use which is not included in the resources monitored by migration managers 110. For example, resource monitor 202 may monitor the availability of network resources between virtual machine 112a and 112b.

With continued reference to FIG. 3A, the profile creator 204 utilizes the received machine resource use data and migration profiles, as well as the previously gathered resource usage information, in order to creation a group migration profile. Similarly to the creation of individual migration profiles, the group migration profile may include suitable time periods of migration for one or more virtual machine instances. For example, the external migration manager 114 profile may determine that virtual machine instances 108a, 108b, and 108c, when taken as a group, have lowered RAM usage once each 10 days. The group migration profile may then reflect that this period of lowered usage is suitable for migrations.

In addition, additional group resource use information may be incorporated into the migration profile. Illustratively, the profile creator 204 may determine that during many time periods in which the virtual machine instances 108a, 108b, and 108c use relatively little RAM, the network resources which are available to the virtual machine instances for migration are also greatly reduced. As such, even though RAM usage of the virtual machine instances is low, these time periods may not be preferred for migration. It should be further noted that the migration of multiple virtual machine instances 108 does not necessarily require simultaneous or constant migration of each instance. In some instances, it may be preferred that individual virtual machine instances 108 be migrated at distinct periods of time, for example according to their own individual migration profile. Such individual migrations would still result in the migration of all requested virtual machine instances. Similarly to as described above, the profile creator 204 may use additional information when creating a group migration profile. For example, migration policies may identify certain time periods that are more or less preferred (relative to other time periods) for migration of one or more virtual machine instances, or that migration of individual or groups of virtual machine instances should result in less than a specified downtime for instance or instances.

With reference now to FIG. 3B, a simplified block diagram illustrating a migration event is depicted. As illustrated in FIG. 3B, the external migration manager 114 receives a request to migrate one or more virtual machine instances. Illustratively, the migration manager may receive a request to migrate virtual machine instances 108a, 108b, and 108c from physical machine 112a to physical machine 112b. In addition, the request may specify a desired time frame during which the migrations should be completed. For example, the migration request may specify that the migration of all three virtual machine instances should be completed within 24 hours. In other instances, the migration request may specify that virtual machine instance 108a should be migrated within 12 hours, while the other virtual machine instances 108b and 108c should be migrated within 3 days. Still further, the migration request may specify additional parameters for migration, such as the desired maximum downtime of one or more virtual machine instances during migration, or the method of migration. These parameters may, in some instance, override parameters that may have been specified in the migration policies.

In some embodiments, migration events may occur without receipt of an explicit request for migration. For example, the migration manager 110 or external migration manager 114 may detect events that have been determined to require the migration of a virtual machine instance or instances. For example, in one aspect, the migration manager 110 may detect an event which limits the ability of a physical computing device 112 to host a virtual machine instance 108. Examples of such limiting events include, but are not limited to, malfunction of the physical computing device 112 or possible impending loss of power to the physical computing device 112. In a second aspect, a migration event may occur when the migration manager 110 determines that a virtual machine instance 108 may be more suitably hosted by a different physical computing device 112. For example, a virtual machine instance 108 may be provided with more available resources if migrated to a second physical computing device 112. Further, the migration manager 110 may determine that specific virtual machine instances 108 should be migrated to share a physical computing device 112. For example, where a first virtual machine instance 108 requires high CPU usage but low RAM usage or RAM access, and a second virtual machine instance 108 requires low CPU usage but high RAM usage, the migration manager 110 may migrate one or both virtual machine instances so that they may share a single physical computing device 112. Though these aspects are provided for the purposes of illustration, one of ordinary skill in the art will appreciate that migration events may occur without receipt of an explicit request for migration in response to any number of occurrences. In these embodiments, the migration manager 110 or an external migration manager 114 may then schedule a migration without first receiving a migration request.

Once a migration event has been determined, such as a migration request or detection of other migration criteria, the migration scheduler 210 determines parameters for migration according to the migration profile and the received migration request, if any. Illustratively, where a request to migrate virtual machine instances 108a, 108b, and 108c from physical machine 112a to physical machine 112b is received, the migration scheduler 210 determines the next migration period of each virtual machine instance which complies with the received migration policies and the received request. In some embodiments, these migration periods are determined according to the group migration profile including these three virtual machine instances. In further embodiments, migration periods may be determined according to a group migration profile in conjunction with individual virtual machine migration profiles, or other criteria. In addition to utilizing the information within a group migration profile, the migration scheduler may incorporate the effects of each virtual machine instance's migration into the overall group migration schedule. For example, migration of virtual machine instance 108b may otherwise possible at certain time periods, but network resources between physical computing devices 112a and 112b may be low during these time periods. However, the migration scheduler 210 may determine that if virtual machine instance 108a is first migrated from physical computing device 112a to physical computing device 112b, then network resource availability may increase. In this example, migration scheduler 210 may attempt to migrate virtual machine instance 110a prior to virtual machine instance 108b in order to increase the efficacy of the overall migration.

In addition to detecting time periods for migration of virtual machine instances, the migration scheduler 210 may determine the method or methods by which a virtual machine instance migration will occur. For example, the migration scheduler 210 may schedule the migration of virtual machine instance 108a a by a "live migration operation." Such an operation may seek to migrate as much of the needed information from physical machine 112a to physical machine 112b without disabling virtual machine instance 108a. A live migration may occur, for instance, by means of copy-on-write functionality. The migration scheduler may, according to the group migration profile, the individual migration profile of virtual machine instance 108a, or other migration policies, determine that a live migration operation is desirable for virtual machine instance 108a. In other embodiments, migration may occur by disabling virtual machine instance 108a on physical machine 112a and copying all necessary information to physical machine 112b, or migration may occur by other means.

Once the parameters for the migration of the virtual machine instances are determined, the migration scheduler 210 transmits commands in order to cause the migration of the request virtual machine instances according to the determined parameters. The physical computing device 112a then executes the received migration commands in order to cause the migration of virtual machine instances 108a, 108b, and 108c. In some embodiments, the migration manager 114 may further monitor a migration process of a virtual machine instance. Illustratively, the migration manager 114 may limit the network resources used by a virtual machine instance during migration, and adjust the network resources available to the migration according to the state of the migration and the available network resources. In some embodiments, the migration manager 114 may incorporate the necessary functionality to migrate virtual machine instances directly, or to monitor and control the migration of virtual machine instances directly. However, a will be appreciated by one of ordinary skill in the art, it is not necessary that the migration manager directly incorporate this functionality. In some embodiments, the migration manager 114 may cause the migration of virtual machine instances via other components of the virtual network. The migration manager 114 may cause such migration, for example, by transmitting migration commands to migration software or systems. In still more embodiments, the monitoring and control of a migration may also be implemented through use of other virtual network components, such as migration software or systems.

With reference now to FIG. 3C, a simplified block diagram illustrating the results of the executed migration commands is shown. The virtual machine instances 108a, 108b, and 108c are migrated to physical computing device 112b.

Figure 4:
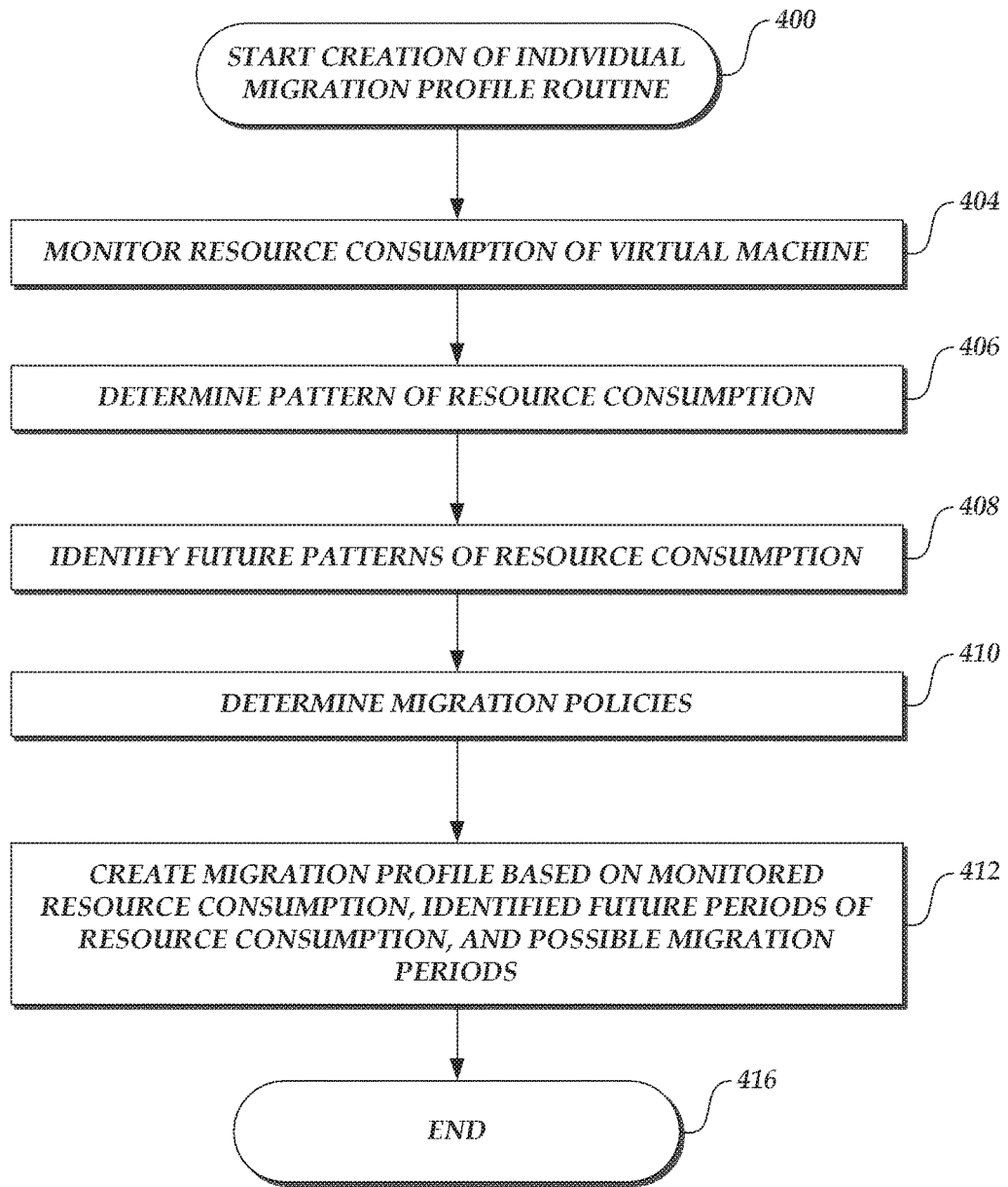
FIG. 4 is a flow-diagram illustrating a migration profile creation routine for an individual virtual machine instance implemented by a migration manager.

With reference now to FIG. 4, an illustrative flow-diagram depicting a routine 400 for the creation of a migration profile of an individual virtual machine instance is depicted. This routine may be carried out by, for example, a migration manager 110 of FIG. 1, or by an external migration manager 114 of FIG. 1. At block 404, the migration monitor 110 monitors the resource consumption of a virtual machine instance. As described above, the monitored resource use can correspond to any combination of resources available to the virtual machine. Examples of such resources include, but are not limited to, RAM usage, HDD usage, CPU or GPU usage, or network resource availability.

At block 406, patterns of resource consumption are determined according to the resource consumption information obtained at block 404. These patterns may correspond to repeated periods of similar resource usage. Similar to as described above, a virtual machine instance may have relatively low consumption of a particular resource during nighttime. The same virtual machine instance may have high resource consumption during the day. Further, as stated above, the resource usage of a virtual machine instance may depict multiple repeating patterns. For example, RAM usage may be lowered during the night, and also lowered during non-business days. In some instances, patterns may not be shared between various sorts of resources. For example, periods may exist where RAM usage is generally low, but HDD usage is generally high. Such instances might correspond, for example, to scheduled HDD backup routines during low traffic times. The migration manager 110 would therefore determine multiple patterns with respect to each resource. In such scenarios, the migration manager 110 may combine usage or consumption information in determining patterns. Alternatively, the migration manager 110 may utilize a weighting function in generating profiles or prioritize resources or resource types in the determination of resource use or consumption patterns.

At block 408, these patterns of resource consumption are used to determine future patterns of resource consumption. For example, if a virtual machine instance has, based on the monitored resource consumption, previously had low levels of RAM usage during nighttime hours, then block 408 may identify nighttime hours as time periods in which the virtual machine instance is likely to have low RAM usage in the future. As will be appreciated by one of ordinary skill in the art, such future patterns may be determined with respect to any monitored resource. Further, where multiple patterns of resource use have been determined, such patterns may reflect the future usage of multiple resources. In some embodiments, as described above, the migration manager 110 may combine usage or consumption information in determining patterns, or utilize a weighting function in generating profiles or prioritize resources or resource types in the determination of future resource use or consumption patterns. Further, as will be described below, these future patterns of resource consumption may be used to identify possible time periods suitable for migration within parameters specified in a migration request or in received migration policies.

At block 410, migration policies are determined. These policies, as previously described, may specify the acceptable downtime of a virtual machine instance during migration. They may further specify that certain time periods, such as non-business days, are preferable for migration of the virtual machine instance, or that certain time periods are less preferred. The migration policies may further specify that the migration may not occur during certain time periods, such as, for example, time periods in which the virtual machine instance must be accessible. As will be appreciated by one of ordinary skill in the art, the migration policies may include any number of criteria that may affect the scheduling of virtual machine instance migrations.

At block 412, a migration profile is created according to the monitored resource consumption, the determined patterns of resource consumption, and the determined future periods of resource consumption. For example, the determined future patterns of resource consumption may show that time periods of lowered resource consumption are expected to occur once every hour. The migration manager 114 may determine that these time periods are suitable for the migration of the virtual machine instance according to the received migration policies. Further, the received migration policies may specify that migration may not occur during daytime hours. The migration manager 114 may then create a migration profile which reflects a determination that suitable time periods for migration occur once every hour during non-daytime hours.

Figure 5:
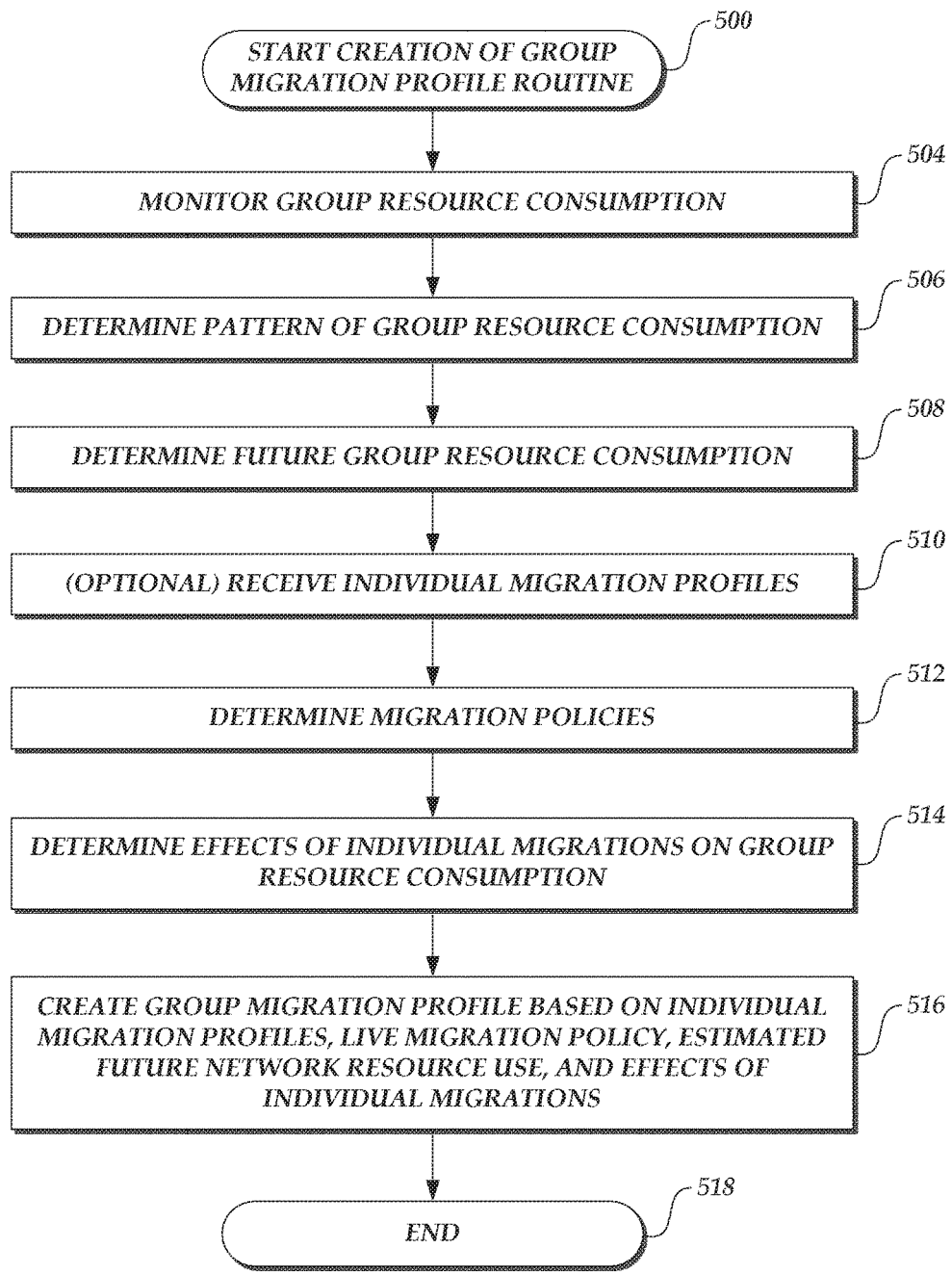
FIG. 5 is a flow-diagram illustrating a migration profile creation routine for multiple virtual machine instances implemented by a migration manager.

With reference now to FIG. 5, an illustrative flow-diagram depicting a routine 500 for the creation of a group migration profile of multiple virtual machine instances is shown. This routine may be carried out by, for example, the external migration manager 114 of FIG. 1. At block 504, the migration manager 114 monitors the resource consumption of a group of virtual machine instances. The migration manager may monitor any resource or combination of resources available to the individual virtual machine instances. In addition, the migration manager 114 may monitor group resources available to the virtual machine instances collectively. Examples of such group resources include, but are not limited to, network or CPU resources shared by virtual machine instances.

At block 506, the migration manager 114 determines patterns of group resource consumption according to the resource consumption information obtained at block 504. As described above, these patterns may correspond to repeated similar time periods of resource usage. For example, multiple virtual machine instances connected to a single network gateway may, collectively, use low amounts of network resources on certain days of a week. Similarly, the virtual machine instances may use higher network resources during other days. As described above, multiple independent patterns of resource usage may exist, such that the migration manager 114 may determine a plurality of patterns with respect to any given group. In such scenarios, the migration manager 110 may combine usage or consumption information in determining patterns. Alternatively, the migration manager 110 may utilize a weighting function in generating profiles or prioritize resources or resource types in the determination of resource use or consumption patterns.

At block 508, these patterns of group resource consumption are used to determine future patterns of resource consumption. Illustratively, if a group of virtual machine instances has, based on the monitored group resource consumption, had lower levels of network resource use every 10 days, then the migration manager 114 may identify future instances of low network resource use as likely to occur every 10 days. As will be appreciated by one of ordinary skill in the art, such future patterns may be determined with respect to any monitored group resource. Further, where multiple patterns of group resource use have been determined, such patterns may reflect the future usage of multiple group resources. In some embodiments, as described above, the migration manager 114 may combine usage or consumption information in determining patterns, or utilize a weighting function in generating profiles or prioritize resources or resource types in the determination of future group resource use or consumption patterns.

Optionally, at block 510, the migration manager 114 may receive individual migration profiles. These migration profiles may correspond to profiles as created by, for example, the flow-diagram of FIG. 4. As will be described below, these individual migration profiles may be utilized in combination with the previous elements of the routine 500 in order to create a group migration profile.

At block 512, the migration manager 114 determines a set of migration policies. These policies, as previously described, may specify the acceptable downtime of a virtual machine instance during migration. They may further specify that certain time periods, such as non-business days, are preferable relative to other time periods for migration of the virtual machine instance, or that certain time periods are less preferred relative to other time periods. The migration policies may further specify that the migration may not occur during certain time periods, such as, for example, time periods in which the virtual machine instance must be accessible. As will be appreciated by one of ordinary skill in the art, the migration policies may include any number of criteria that may affect the scheduling of virtual machine instance migrations.

At block 514, the migration manager 114 determines the effects of individual migrations on group resource consumption. This determination entails determining group resource use before, during, and after migration of an individual virtual machine instance within the group of virtual machine instances for which the group migration profile is being prepared. For example, a group migration profile may be created for virtual machine instances 108a, 108b, and 108c of FIG. 3. When taken as a group, time periods of lowered resource usage may be identified every 10 days. However, if virtual machine instance 108a were migrated, then the resulting group (comprised of virtual machine instances 108*b* and 108*c*) may then have time periods of lowered resource usage every 3 days. In other instances, migration of an individual virtual machine instance may have little or no effect on patterns of group resource consumption.

At block 516, the migration manager 114 creates a migration profile according to the monitored group resource consumption, the identified future group resource consumption, the determined migration policies, and, optionally, the received individual migration profiles. This migration profile may then be used by the migration manager 114 to determine appropriate time periods of migration for the group of virtual machine instances. For example, when a migration of the group of virtual machine instances is requested, the migration manager may determine, as described above with respect to FIG. 3B, the timing and order in which to migrate the group of virtual machine instances.

Figure 6:
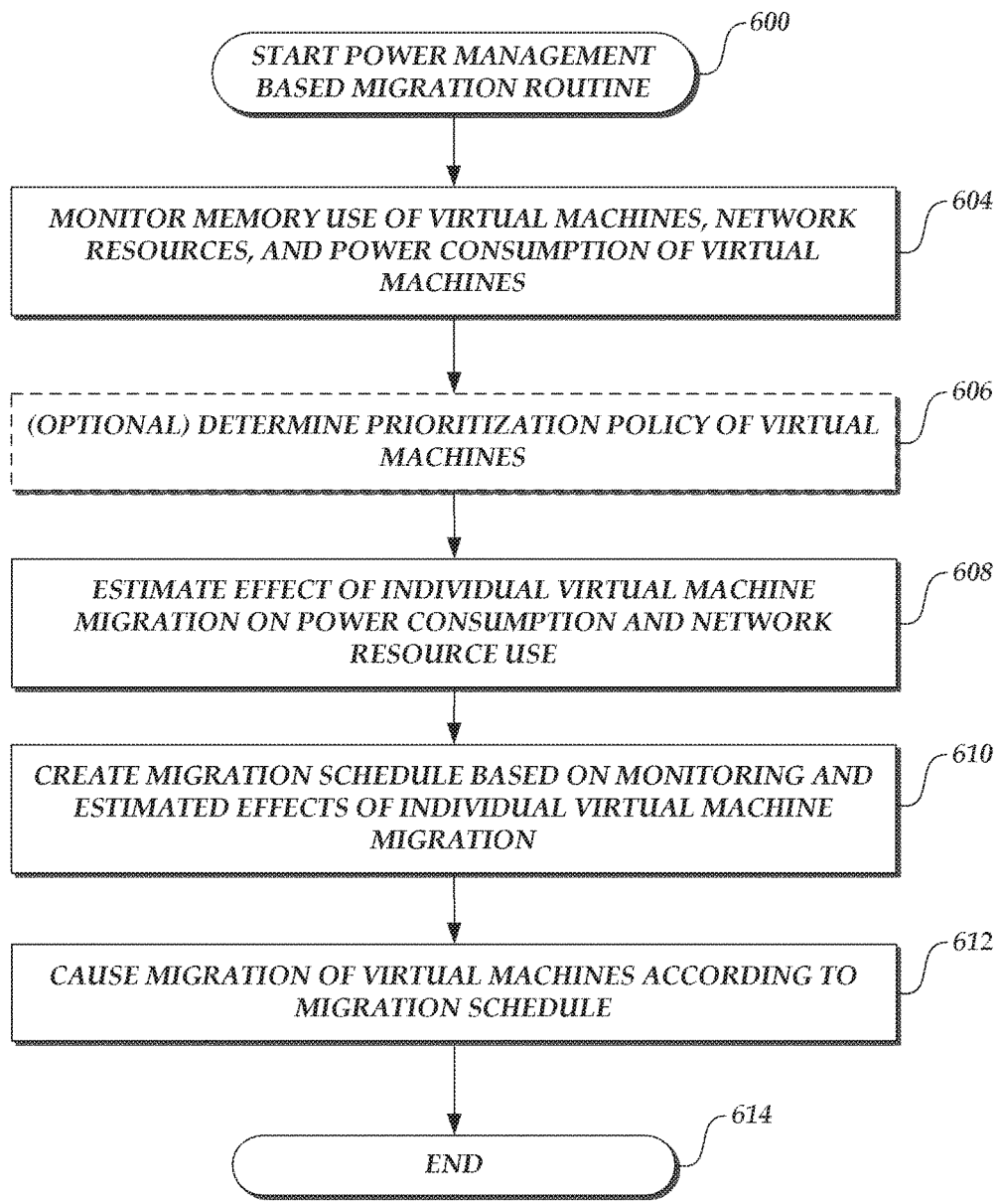
FIG. 6 is a flow-diagram of a virtual machine instance migration routine based on the power consumption of the virtual machine instances and implemented by a migration manager.

With reference now to FIG. 6, an illustrative flow-diagram displaying a routine 600 for power management based migration of virtual machine instances is depicted. In this embodiment, migrations of virtual machine instances are executed in order to manage the power usage of one or more physical computing devices. Illustratively, routine 600 may be invoked by a migration manager, such as migration manager 114 of FIG. 1, in response to a determination that a physical computing device, such as physical computing device 112*a* of FIG. 3A, is operating on a limited supply of power. In this example, the migration manager 114 may wish to schedule migrations in order to preserve the power available to physical computing device 112*a*.

At block 604, the migration manager 114 monitors the resource usage of the virtual machine instances. In the current example, the memory use, such as HDD and RAM usage, the power consumption, and the network resource use of each virtual machine is monitored, as well as the network resource available to the group of machines. Though these resources are depicted for the purposes of the current example, one of ordinary skill in the art will appreciate that any number of resources may be relevant to power management based migration. In some instances, resources depicted here may not be monitored. Hard disk drive usage might not be monitored, for example, when the hard disk drives are operating from a device that is not subject to the same power management restrictions as the virtual machine instance.

Optionally, at block 606, prioritization policies of the virtual machine instances may be determined. For example, some virtual machine instances may be given higher prioritization under power management migration situations, such that they may be preferred to be migrated over other virtual machine instances.

At block 608, the effects of migrations of individual virtual machine instances are determined with respect to network resource use and power consumption. For example, a virtual machine instance with high CPU usage and low RAM usage may require relatively low levels of network resource use in order to be migrated, and require relatively high levels of power in order to operate. Conversely, a virtual machine instance with low CPU usage and high RAM usage might require relatively large levels of network resources in order to be migrated, and relatively small levels of power in order to operate. In addition, the migration of virtual machine instances may have further effects on resource availability. For example, a virtual machine instance may be using a relatively low amount of RAM, have low CPU usage, but require a high amount of network resources in order to operate. Migration of this instance, therefore, would require few resources, but allow other virtual machine instances to be migrated more quickly by freeing up large amounts of network resources.

At block 610, a migration schedule is created according to the monitored resource usage of the virtual machine instances and the estimated effects of individual migrations. This migration schedule may, for example, calculate a cost of migration of each of the virtual machine instances. Virtual machine instances which require high amounts of power, but low amounts of network resources in order to transfer may be given a relatively low cost of migration. Similarly, virtual machine instances which require low amounts of network resources in order to transfer, and which require large amounts of network resources to operate, may be given a lower cost of migration. Virtual machine instances which require large amounts of network resources to transfer, such as due to large amounts of RAM usage, but require little network resources or power to operate may be assigned a high cost of migration. Additionally, if prioritization policies were determined at block 606, these policies might alter the cost of a virtual machine instance. For example, if a virtual machine instance has a high prioritization, the cost of migration of the virtual machine instance may be lowered. The migration schedule in this example would then reflect the cost of migration of the virtual machine instances, such that virtual machine instances with lower migration costs may be scheduled prior to virtual machine instances with higher costs of migration.

At block 612, the migration of the virtual machine instances is caused according to the migration schedule created at block 610. As previously described, these migrations may be accomplished according to various migration types. For example, migrations may occur via a copy-on-write process, in order to minimize downtime of a virtual machine. In some embodiments, migration may occur by shutting down a virtual machine instance in order to directly copy all needed information to a new physical machine. Further, as previously described, the routine 600 may continue to monitor the migration of one or more virtual machine instances in order to modify the parameters of the migration. For example, the network resources available to a particular migration may be modified according to the available network resources or the status of the migration.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer-executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   receiving a request to migrate a virtual machine instance over a communications network from a first physical host computing device connected to the communications network to a second physical host computing device connected to the communications network;
   obtaining a history of resource use associated with the virtual machine instance;
   identifying an anticipated future pattern of resource use associated with the virtual machine instance based at least partly on the history of resource usage;
   determining, for each of a set of potential future migration times distinct from a present point in time, an estimated length of time for migration of the virtual machine if migrated during the potential future migration time, wherein each estimated length of time for migration is determined based at least in part on the anticipated future pattern of resource use associated with the virtual machine;
   selecting a migration time from the set of potential future migration times based at least in part on the estimated length of time for migration of the virtual machine if migrated at the selected migration time; and
   causing the virtual machine instance to be migrated at the selected migration time, wherein causing the virtual machine instance to be migrated includes causing information representing the virtual machine instance to be transferred over the communications network from the first physical host computing device to the second physical host computing device.

2. The computer-implemented method of claim 1, further comprising generating a migration profile indicating the estimated length of time for migration of the virtual machine if migrated during each of the set of potential future migration times.

3. The computer-implemented method of claim 2, wherein selecting a migration time from the set of potential future migration times based at least in part on the estimated length of time for migration of the virtual machine if migrated at the selected migration time comprising selecting a migration time by utilizing the migration profile.

4. The computer-implemented method of claim 2, wherein the migration profile further indicates one or more migration policies for the virtual machine instance.

5. The computer-implemented method of claim 4, wherein the one or more migration policies indicate at least one of a maximum length of time for migration of the virtual machine instance, a time period during which migration of the virtual machine instance may not occur, or a time period during which migration of the virtual machine instance is preferred to occur.

6. The computer-implemented method of claim 4, wherein the migration profile further indicates at least one of the set of potential future migration times during which migration of the virtual machine instance could occur in compliance with the one or more migration policies.

7. The computer-implemented method of claim 1, further comprising:
   monitoring migration of the virtual machine instance; and
   limiting a rate of the migration such that the migration consumes network resources within a specified range.

8. The computer-implemented method of claim 1, further comprising:
   determining that migration of the virtual machine instance will not complete within a threshold time period; and
   increasing an amount of network resources available to conduct the migration.

9. A system comprising:
   a non-transitory data store including data indicating a history of resource use associated with a virtual machine instance; and
   one or more computing devices in communication with the non-transitory data store and configured with computer-executable instructions that, when executed, cause the one or more computing devices to:
   identify, from at least the history of resource use, an anticipated future pattern of resource use associated with the virtual machine instance;
   determine, for each of a set of potential future migration times distinct from a present point in time, an estimated length of time for migration of the virtual machine if migrated during the potential future migration time, wherein each estimated length of time for migration is determined based at least in part on the anticipated future pattern of resource use associated with the virtual machine;
   receive a request to migrate the virtual machine instance over a communications network from a first host computing device connected to the communications network to a second host computing device connected to the communications network;
   select a migration time from the set of potential future migration times based at least in part on the estimated length of time for migration of the virtual machine if migrated at the selected migration time; and
   causing the virtual machine instance to be migrated at the selected migration time, wherein causing the virtual machine instance to be migrated causes information representing the virtual machine instance to be transferred over the communications network from the first physical host computing device to the second physical host computing device.

10. The system of claim 9, wherein the computer-executable instructions further cause the one or more computing devices to:
    monitor migration of the virtual machine instance; and
    limit a rate of the migration such that the migration consumes network resources within a specified range.

11. The system of claim 9, wherein the computer-executable instructions further cause the one or more computing devices to:
   determine that migration of the virtual machine instance will not complete within a threshold time period; and
   increase an amount of network resources available to conduct the migration.

12. The system of claim 9, wherein the anticipated future pattern of resource use indicates time periods during which a resource use of the virtual machine is anticipated to be below a specified resource use level.

13. The system of claim 9, wherein the history of resource use indicates a history of use by the virtual machine instance of at least one of random access memory (RAM), a hard disk drive (HDD), a central processing unit (CPU), a graphics processing unit (GPU), a network resource, or energy.

14. The system of claim 9, wherein the computer-executable instructions further cause the one or more computing devices to generate a migration profile indicating the estimated length of time for migration of the virtual machine if migrated during each of the set of potential future migration times.

15. Non-transitory computer-readable media including computer executable instructions executable by a computing system to:
   utilize a history of resource use of a virtual machine instance to identify an anticipated future pattern of resource use associated with the virtual machine instance;
   from at least the anticipated future pattern of resource use associated with the virtual machine, determine an estimated length of time for migration of the virtual machine if migrated during each of a set of potential future migration times, distinct from a present point in time;
   receive a request to migrate the virtual machine instance over a communications network from a first host computing device connected to the communications network to a second host computing device connected to the communications network;
   select a migration time from the set of potential future migration times based at least in part on the estimated length of time for migration of the virtual machine if migrated at the selected migration time; and
   cause the virtual machine instance to be migrated at the selected migration time, wherein causing the virtual machine instance to be migrated includes causing information representing the virtual machine instance to be transferred over the communications network from the first physical host computing device to the second physical host computing device.

16. The non-transitory computer-readable media of claim 15, wherein the computer-executable are further executable by the computing system to:
   monitor migration of the virtual machine instance; and
   limit a rate of the migration such that the migration consumes network resources within a specified range.

17. The non-transitory computer-readable media of claim 15, wherein the computer-executable are further executable by the computing system to:
   determine that migration of the virtual machine instance will not complete within a threshold time period; and
   increase an amount of network resources available to conduct the migration.

18. The non-transitory computer-readable media of claim 15, wherein the computer-executable are further executable by the computing system to generate a migration profile indicating the estimated length of time for migration of the virtual machine if migrated during each of the set of potential future migration times.

19. The non-transitory computer-readable media of claim 15, wherein the history of resource use indicates at least one of an amount of one or more resources used by the virtual machine instance or a rate of change in use of the one or more resources by the virtual machine instance.

20. The non-transitory computer-readable media of claim 15, wherein the computer-executable instructions cause the computing system to identify the anticipated future pattern of resource use associated with the virtual machine instance at least partly by:
   identifying, in the history of resource usage, a set of time periods associated with similar resource usage; and
   selecting the similar resource usage associated with the set of time periods as the anticipated future pattern of resource use.

21. The non-transitory computer-readable media of claim 15, wherein the estimated length of time for migration corresponds to an estimated downtime of the virtual machine instance during migration.

* * * * *